Dec. 2, 1930.        G. SELZER        1,783,677
CHOKE AND NEEDLE VALVE CONTROL
Filed Feb. 27, 1930
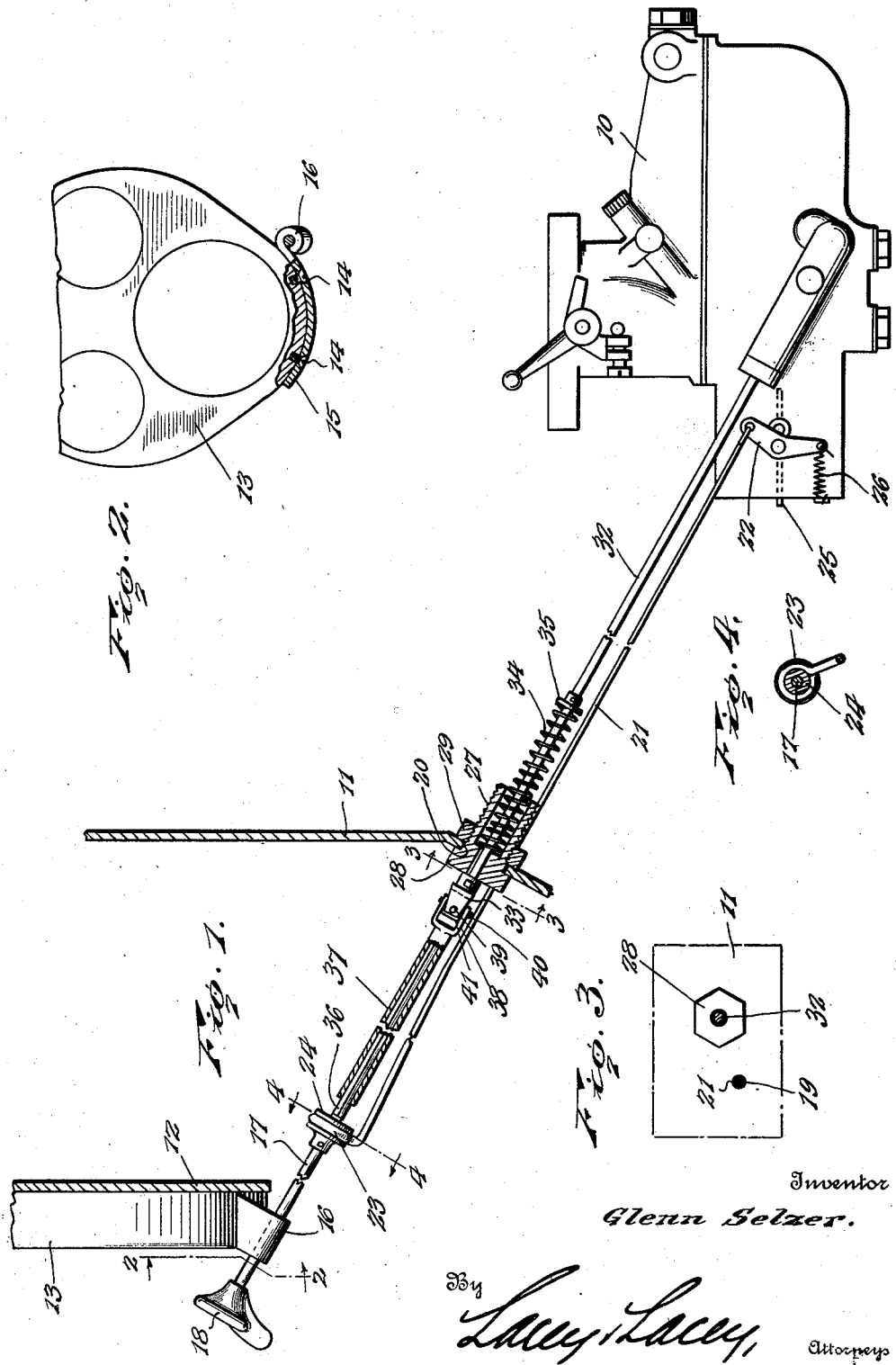
Inventor
Glenn Selzer.
By Lacey & Lacey, Attorneys Patented Dec. 2, 1930

1,783,677

UNITED STATES PATENT OFFICE

GLENN SELZER, OF PROTECTION, KANSAS

CHOKE AND NEEDLE-VALVE CONTROL

Application filed February 27, 1930. Serial No. 431,925.

This invention relates to choke and needle valve controls for automobiles and has for an object to provide an extremely simple device of this character which will be associated with the instrument casing on the instrument panel so as to be within convenient reach of the driver.

A further object of the invention is to provide a novel needle valve control comprising a jointed rod rotatable about its longitudinal axis for adjusting the needle valve and having a spring for holding the rod against rattling.

A still further object is to provide a device of this character which may be readily secured to the instrument casing of an automobile more especially the Ford automobile which has the instrument casing already provided with screws in the bottom which may be utilized in attaching the device to the instrument casing.

A still further object of the invention is to provide a device of this character which may be formed of a few simple and durable parts which are inexpensive to manufacture and will not easily get out of order.

With the above and other objects in view the invention consists in certain novel details of construction and combinations of parts hereinafter fully described and claimed it being understood that various modifications may be resorted to within the scope of the appended claim without departing from the spirit or sacrificing any of the advantages of the invention.

In the accompanying drawing forming part of this specification,

Figure 1 is a side elevation of my improved device showing the application thereof to the carbureter, dash and instrument casing of an automobile, Figure 2 is a cross-sectional view on the line 2—2 of Figure 1 with parts broken away, Figure 3 is a cross-sectional view on the line 3—3 of Figure 1, and Figure 4 is a cross-sectional view on the line 4—4 of Figure 1.

Referring now to the drawing in which like characters of reference designate similar parts in the various views, 10 designates the carbureter, 11 the dash, 12 the instrument panel, and 13 the instrument casing of an automobile, preferably the Ford Model A automobile.

Disposed at the bottom of the instrument casing 13 of the Ford Model A there are two screws 14 as best shown in Figure 2, and in carrying out the preferred embodiment of my invention I propose to use these screws for attaching a clip 15 to the bottom of the instrument casing. The clip is curved longitudinally to conform to the curvature of the bottom of the casing and preferably on the right side is provided with an eye 16 which is disposed obliquely to the clip as best shown in Figure 1.

The eye 16 slidably and rotatably receives a cylindrical rod 17 which controls the needle valve as hereinafter more fully described. A button 18 of the usual and well known type is secured to the outer end of the rod in front of the instrument casing and at the bottom thereof, as best shown in Figure 1. This button is within convenient reach of the driver whereas ordinarily the needle valve control is disposed on the instrument board remote from the instrument casing, necessitating the driver reaching across the passenger to manipulate the choke and needle valve control.

By now referring to Figures 1 and 2 it will be seen that spaced openings 19 and 20 are formed in the dash 11. The opening 19 receives a stiff wire 21 the lower end of which is connected to the choke valve lever 22 and the upper end of which terminates in an eye 23 that is bent laterally from the wire and loosely fits in a grooved collar 24 which is secured to the above mentioned needle valve control rod 17.

It will thus be seen that when the button 18 is pulled outwardly the wire 21 will operate the choke valve 25 in the usual manner, the choke valve spring 26 returning the parts to initial position when the button 18 is released. The rod 17 obviously may be rotated by means of the button 18 without disturbing the choke since the eye 23 of the choke wire 21 loosely fits in the groove in the collar 24.

Disposed in the opening 20 is a bushing 27, the bushing being equipped at one end with a hexagonal head 28 and being equipped at the opposite end with a nut 29.

A rod 32 is operatively connected at the lower end to the needle valve of the carbureter 10 and is loosely passed through the bushing 27. The upper end of the rod is equipped with a yoke 33 which is held yieldably against the head 28 by means of a spring 34 which surrounds the rod 32 and is confined under tension between the inner end of the bushing 27 and a collar 35 which is fixed to the rod. The spring permits of rotary movement of the rod 32 but resists longitudinal movement of the rod to such an extent as to prevent rattling of the parts while at the same time preventing the rod being pulled upwardly when the choke is operated.

By now referring to Figure 1 it will be seen that the needle valve control rod 17 is provided below the collar 24 with an extension 36 which is preferably square in cross section. A tubular connecting rod 37 also preferably square in cross section slidably receives the rod extension 36. The lower end of the tubular connecting rod is equipped with a yoke 38 which is received in the above mentioned yoke 33.

Pivot pins 39 and 40 disposed at a right angle to each other pass through the above mentioned yokes 33 and 38 and through an intermediate block 41 and produce substantially a universal joint between the rod 32 and tubular rod 37. The purpose of this universal joint is to permit of the rotary movement of the rod 17 being transmitted to the rod 32 regardless of whether these rods are in alignment or not.

In operation, the driver may conveniently reach the button 18 and pull it outwardly to operate the choke and at the same time may turn the button to rotate the needle valve control rod and regulate the needle valve as desired. Upon release of the button the spring 26 returns the parts to inoperative position.

From the above description it is thought that the construction and operation of my invention will be easily understood.

Having thus described the invention, I claim:

A choke and needle valve control mechanism comprising a bushing adapted to be secured to the dash of an automobile, a rod for manipulating the needle valve of a carbureter passing through said bushing, a spring on said rod bearing against said bushing and holding said rod at its lowest limit of movement through said bushing, a connecting link substantially square in cross section pivotally secured to said rod, a second rod having an extension substantially square in cross section slidably fitting in said connecting link, and terminating at one end in a button, a grooved collar on the last named rod, and a wire for manipulating the choke of a carbureter having a laterally disposed eye loosely encircling said grooved collar.

In testimony whereof I affix my signature.

GLENN SELZER. [L. S.]